United States Patent

[11] 3,553,423

| [72] | Inventor | Brian C. Doxey<br>Welwyn, England |
|---|---|---|
| [21] | Appl. No. | 725,998 |
| [22] | Filed | May 2, 1968 |
| [45] | Patented | Jan. 5, 1971 |
| [73] | Assignee | The British Oxygen Company Limited<br>a British Company |
| [32] | Priority | May 5, 1967 |
| [33] | | Great Britain |
| [31] | | No. 21052/67 |

[54] WIRE FEEDING
11 Claims, 5 Drawing Figs.

[52] U.S. Cl..................................................... 219/130,
291/74; 226/97; 314/68
[51] Int. Cl..................................................... B23k 9/00
[50] Field of Search........................................... 219/74, 76,
121, 130, 137; 314/68; 226/97

[56] References Cited
UNITED STATES PATENTS

| 3,108,176 | 10/1963 | Simon | 219/74 |
|---|---|---|---|
| 3,116,889 | 1/1964 | Lasch et al | 226/91 |
| 3,165,661 | 1/1965 | Taleff | 314/68 |
| 3,211,883 | 10/1965 | Zimmermann | 219/74 |
| 3,241,956 | 3/1966 | Inoue | 219/69 |
| 3,270,179 | 8/1966 | Russell | 219/74 |
| 3,307,761 | 3/1967 | Miller et al. | 226/97 |
| 3,319,859 | 5/1967 | Miller | 226/97 |
| 2,870,320 | 1/1959 | Mathews | 219/74 |
| 3,076,088 | 1/1963 | Molina | 219/74 |
| 3,185,813 | 5/1965 | Kennedy | 219/74 |

Primary Examiner—J. V. Truhe
Assistant Examiner—C. L. Albritton
Attorney—Townshend & Meserole

ABSTRACT: Thin bare welding wire is fed through a relatively long conduit from a drum to an arc welding torch by passing a stream of liquid along the conduit in the direction of wire feed. The liquid applies traction to the wire causing the wire to pass along the conduit even when the conduit is bent, looped or coiled. The liquid may be caused to flow in either an open or closed circuit; and if an open circuit is used the liquid may act as a flux in the welding process.

WIRE FEEDING

FIELD OF THE INVENTION

The present invention relates to the feeding of flexible wire through an elongated conduit; and is particularly concerned with a method of feeding thin bare welding wire through a relatively long conduit which may be bent, looped or coiled.

Conventional means for feeding wire through a conduit from a drum to a consumption point, for example an arc welding torch comprise powered rollers which grip the wire to pull it off its drum and either push it or pull it through a conduit leading to the consumption point. Some systems use a combination of push and pull rollers to propel the wire, and such means work reasonably well as long as the conduit remains fairly straight without any loops or sharp bends. However, as soon as these conditions exist, the frictional resistance between wire and conduit rises sharply and the wire is liable to jam in the conduit. In certain circumstances, where very short lengths of conduit are used, it is possible to keep fairly straight runs, but where longer lengths are required, bends and loops frequently occur and these result in jamming of the wire. When using push roller it is found that the longest length which can be fed through a conduit without risk of jamming is about 15 feet, and this means that the operator is limited to this radius of action unless the wire feeding unit is movably mounted. On site work this can be very inconvenient or even impractical.

When using this conventional means the power to drive the wire through the conduit can be applied only externally of the conduit and this form of wire feeding becomes unsatisfactory when loops are present in the conduit. Under such conditions the impedance due to frictional force is magnified considerably, the ratio of forces or wire tensions being given by:

$$\frac{T_1}{T_2} = e^{uo}$$

where $T_1$ and $T_2$ are wire tensions at either end of the loop, $u$ is the coefficient of friction between wire and conduit and $O$ is the angle included by the loop. This formula shows that considerable magnification of impedance forces can occur where loops exist. Frictional resistance between the wire and conduit is quite small and can be reduced by applying a lubricant to the wire and/or conduit. It is the magnification of this resistance by the "capstan effect" of loops and bends which creates the high impedance to motion.

SUMMARY OF THE INVENTION

It is an object of this invention to facilitate the feeding of wire through a conduit and to reduce the risk of the jamming due to the "capstan effect" of loops and bends.

Accordingly the present invention provides apparatus for feeding a flexible wire through an elongated conduit comprising means for introducing a stream of liquid into the conduit in the direction of wire feed to apply traction to the wire. The liquid may be directed to flow in either an open or a closed circuit and the traction liquid may be introduced into the conduit continuously or intermittently.

The traction liquid may be the sole source of motive power driving the wire through the conduit or it may be augmented by thrust and or pull forces exerted upon the wire externally of the conduit. The present invention will now be particularly described by way of example with reference to the accompanying drawings in which.

Figure 1:
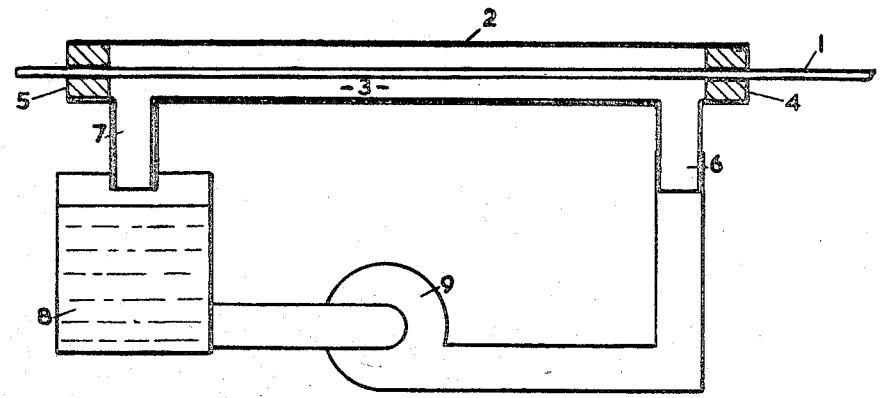
FIG. 1 is a diagram of apparatus for applying traction liquid to a conduit.

Referring to FIG. 1 wire 1 is contained in a relatively large diameter flexible conduit 2 filled with liquid 3; this wire entering the conduit via an inlet seal 4 and leaving by an outlet seal 5.

The liquid enters the conduit via an inlet 6 and leaves by an outlet 7 which is connected to a reservoir 8, and the liquid is drawn from the reservoir by a pump 9 which circulates the liquid through the conduit.

The motion of the liquid passing over the surface of the wire creates a drag, the magnitude of which is dependent upon the relative velocity between the liquid and the wire and the properties of the liquid, such as its viscosity. A given drag on the wire may be created by a liquid with a low viscosity moving at high speed or high viscosity liquid moving at a lower speed, but the power required to drive the pump would be greater with the low viscosity, liquid because of the increased flow rate.

In order to minimize the pump horse power, it is desirable to maintain a liquid velocity to wire velocity ratio of perhaps 3 or 4 to 1 at the maximum wire speed. This method of creating a propulsive force on the wire is very inefficient from a $\frac{\text{power output}}{\text{power input}}$ aspect because most of the liquid power is adsorbed by frictional drag between the liquid and the walls of the conduit which have a much greater surface area than the wire. However tests have shown that sufficient drag may be created on the wire to propel it through 100 to 150 feet of conduit with the whole length of the conduit wound up on and 18 inch diameter drum Less than 1 horse power is required to drive the pump under these conditions.

When feeding welding wire to a welding torch the liquid is returned from the end of the conduit adjacent the torch to the pump by a return pipe which runs alongside or is concentric with the conduit containing the wire. The cross-sectional area of the return pipe would be made several times larger than that of the conduit in order to reduce pressure drops in the return pipe and also to enable the use of less costly low pressure hose.

Figure 2:
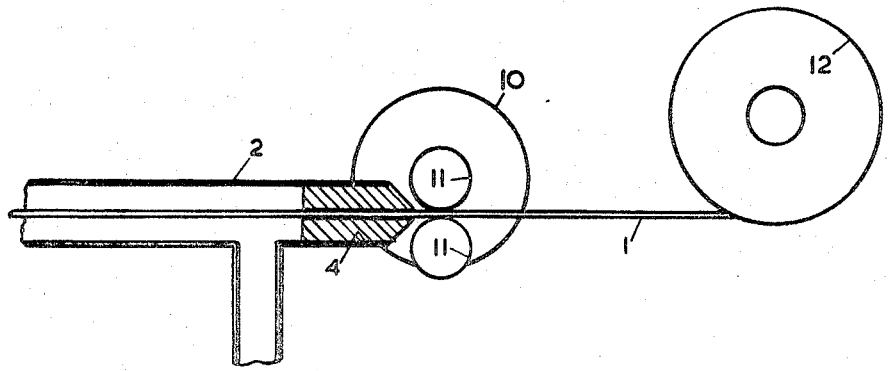
FIG. 2 is a diagram of a roller drive for wire entering a conduit.

Although this method of propelling the wire through the conduit is effective, it is difficult to control the speed of the wire by controlling the liquid, and it has been found necessary to mount a small feeder motor at the inlet guide, as in FIG. 2.

The motor 10 drives a pair of rollers 11 which grip the wire 1 and feed it into the conduit 2 at a speed which may be regulated by controlling the motor speed. The rollers also exert sufficient pull on the wire to pull it off the drum 12 and force it through the inlet seal 4. The force required to do this is very small, so consequently a low power, low cost motor may be used for this purpose.

It is in fact an advantage to use a drive which limits the amount of force exerted on the wire by the roller to prevent buckling and collapse of the wire at the feed end, if stalling occurs at the torch end of the conduit. This roller drive force limiting device could take the form of a slipping clutch between the drive motor and rollers or a current limiting device connected in series with the driving motor.

In certain other situations where the wire may encounter high frictional resistance at the torch, for example torches with sharply curved necks, it is likely that the force exerted on the wire by the liquid is not sufficient to push the wire round a sharply curved neck. In these circumstances the force required at the torch end of the conduit may be created by boosting the liquid drag effect over the last few feet of conduit before the torch. This may be achieved quite simply be reducing the diameter of the conduit carrying the wire for a few feet before the torch, and provided that the liquid flow rate is kept at a constant level this has the effect of increasing the liquid velocity over the length of wire contained in the length of reduced diameter conduit. This then creates a significant increase in viscous drag which is sufficient to overcome the frictional resistance in the torch neck. Alternatively it may be necessary to fit motorized rollers in the torch to grip the wire and propel it through the curved neck and contact tip of the torch. These rollers would not control the speed of the wire but would ideally exert a constant force at all speeds sufficient to overcome frictional resistance between the wire, outlet guides, torch and contact tip. The rollers could be driven electrically, pneumatically or hydraulically from the liquid used to propel the wire. In certain circumstances it may be undesirable to mount the rollers and motor in the torch because of weight considerations in which case the rollers and motor could be placed in the conduit say 6—10 feet away from the torch.

It is evident that after the wire has been immersed in liquid during its travel through the conduit it will retain a film of liquid no matter how closely the outlet seal fits. It is known that most hydrocarbon liquids, such as hydraulic oils, affect the weld by causing porosity if they are present on the welding wire and are carried into the weld pool. This means that the type of liquid to be used in the system must be chosen so that the welding performance of the equipment is not adversely affected.

At present all bare wire electrode welding processes use an inert gas, such as carbon dioxide, argon or helium, to shield the weld pool from the atmosphere to prevent oxidation of the liquid metal.

As the wire feed method described previously is dependent upon a liquid for its means of propulsion, it is desirable to choose a liquid which acts as a flux in the welding process. The liquid would be allowed to flow from the contact tip via suitably designed nozzles. It would then enter the weld pool and be vaporized to form a layer of inert gas, thereby preventing oxidation of the liquid metal. Alternatively, liquid containing solid matter dissolved or suspended in a volatile base liquid can be used, such that the liquid content is vaporized or burned before entering the weld pool, leaving behind the solids which would melt and form a molten antioxidant layer on the surface of the liquid metal.

Figure 3:
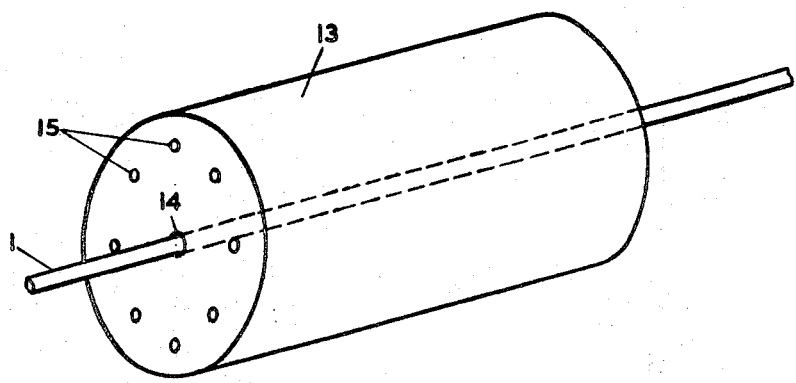
FIG. 3 is a diagram of the contact tip of an arc welding torch.

FIG 3 of the accompanying drawing illustrates the contact tip of an arc welding torch by which heavy welding currents are passed into the welding wire.

It consists essentially of a copper rod 13 with a central hole 14 through which the wire 1 passes, the hole 14 being just large enough for the wire to pass through. In passing through the hole 14, the wire rubs on the sides and current is transferred from the sides of the hole to the wire, the contact tip being electrically connected via a cable to the welding power source. Trouble sometimes occurs when the contact tip overheats due to radiant heat from the arc or poor contact with the wire. This eventually leads to the generation of more heat and may result in the welding of the contact tip to the wire, thus preventing wire feeding.

If a liquid shielded feed process were used, the liquid could be sprayed into the arc via a series of jets 15 drilled into the contact tip. The passage of cool liquid through these jets would help to keep the contact tip down to a lower temperature.

Most semiautomatic welding processes use a shield of an inert gas such as carbon dioxide or argon to exclude air from the weld pool. The gas is usually at a high pressure in a container and in the case of carbon dioxide this is usually in liquid form. By using a suitably designed conduit it is possible to pass the shielding gas directly from the container at high pressure, down the conduit and over the surface of the wire in order to create the viscous drag necessary to propel the wire through the conduit. When the wire and shielding gas emerge at the torch end of the conduit, the gas forms a blanket over the weld pool in the normal way and furthermore the wire would not be contaminated by the propelling liquid.

In the case of carbon dioxide, which is normally in liquid state in its container, it is possible to pass the gas in liquid form down the conduit to cause drag on the wire. The liquid is converted into gaseous form during its passage down the conduit or where it emerges from the torch to perform its shielding function.

The advantages of using the shielding gases in this way are that no return pipe is necessary to conduct the liquid back to to the recirculating pump since the propelling liquid is consumed at the torch end of the conduit, and no pump is required to pressurized the liquid as the shielding gas is already at high pressure within the container.

Control of wire speed would be by motor driven rollers as previously described.

In carrying out this invention it is thought that the following liquids could be used in small quantities as the traction liquid without contaminating the weld: oils of different base; water, either with or without a thickening agent; soluble silicates or colloidal graphite. If water is used, then paraffin or any other suitable water repellent may be sued in removing the water.

The following traction liquids may also provide the shielding gas for the welding process: sodium alginate with 2 percent water; natrasol (sodium carboxylmethyl cellulose), sodium or potassium silicate, tri-methyl borate dissolved in methanol, sodium bicarbonate with sodium silicate, or liquid or gaseous carbon dioxide.

In the closed liquid circuit illustrated in FIG 1, there is a tendency for liquid to leak out of the conduit 2 through the inlet seal 4 and outlet seal 5.

Figure 4:
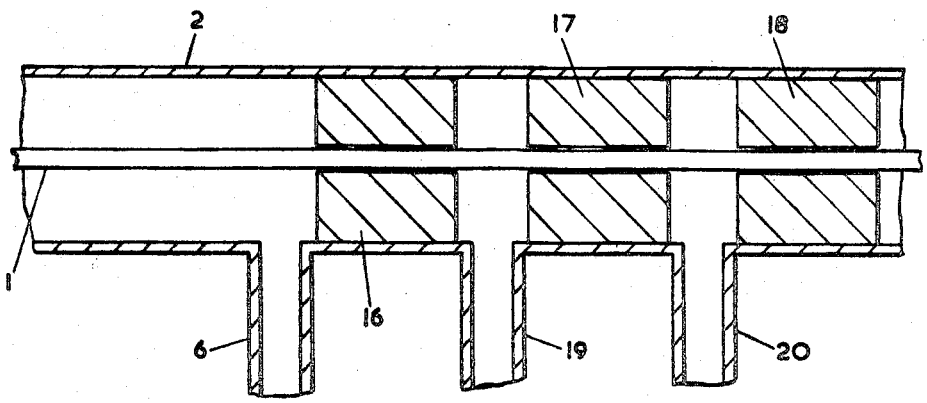
FIG. 4 is a diagram of an inlet seal for the conduit.

FIG. 4 illustrates an arrangement of nylon inlet guides 16, 17 and 18 which constitute the inlet seal 4 in the conduit 2. The wire 1 enters the conduit 2 through central coaxial orifices in the inlet guides, and the traction liquid enters the conduit 2 through the inlet 6. Any liquid leaking between the wire 1 and the surrounding guides 16 and 17 is returned to the reservoir 8 at low pressure through pipes 19 and 20.

When using a low viscosity liquid such as water for the traction liquid it may be necessary to use several guides in series in order to prevent leakage to the atmosphere. It has been found in practice that a system of three guides as illustrated in FIG. 4 is sufficient to prevent leakage when using water as the traction liquid.

Figure 5:
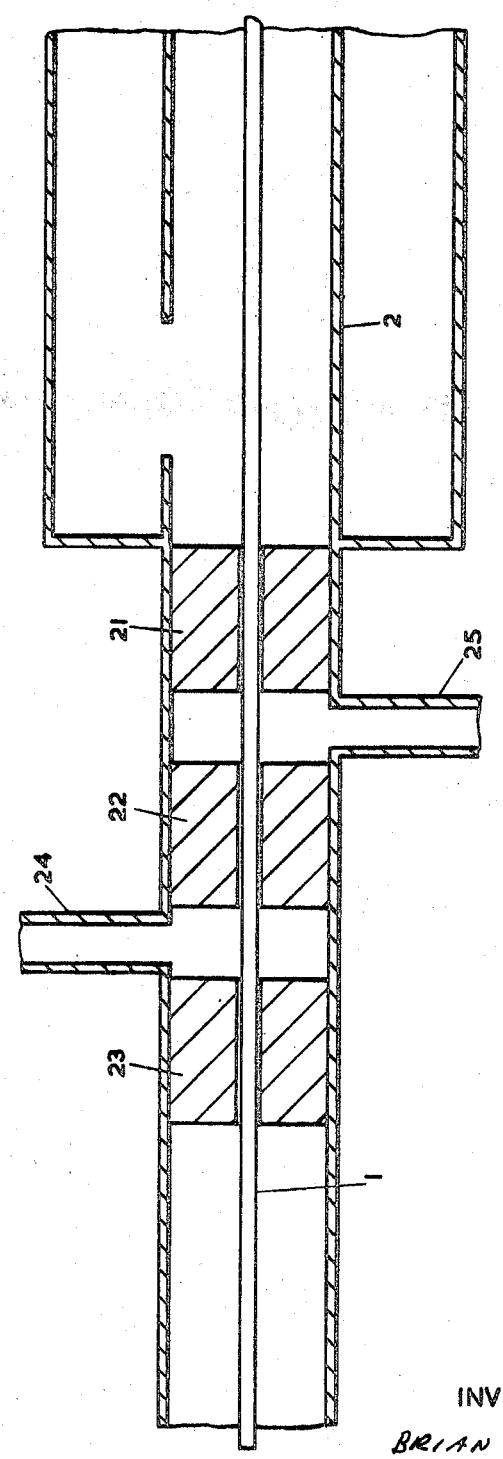
FIG. 5 is a diagram of an outlet seal for the conduit.

FIG. 5 illustrates a generally similar system of nylon outlet guides 21, 22 and 23 which constitute the outlet seal 5. Guide 21 removes most of the traction liquid from the wire 1 leaving only a thin film of liquid on the surface of the wire; and the wire then passes through the guide 22 which is a comparatively loose fit on the wire. A gas supply, which can conveniently be the weld shielding gas, is connected to a branch pipe 24 downstream of the guide 22 so that a high velocity stream of gas can be passed in the opposite direction to the wire feed through the annulus between the wire 1 and the central orifice in the guide 22. The terms downstream and upstream are used herein with reference to the direction of wire feed. This gas stream removes the liquid film from the wire surface and the liquid is ejected from the conduit 2 through an exit port 25 positioned between the guides 21 and 22. The guide 23 makes a relatively close fit with the wire 1 so as to prevent excessive gas leakage through the torch.

This technique of removing the liquid from the emerging wire is very effective with low viscosity liquids such as water. In fact, water is a particularly easy liquid to remove because it does not wet the wire completely but tends to adhere to the wire in droplets which are easily blown off by the gas stream.

I claim:

1. Apparatus for feeding a flexible wire through an elongated conduit, said apparatus comprising an elongated conduit having means defining a first inlet and outlet, means for feeding a flexible wire therethrough and a liquid inlet and a liquid outlet connected near the first inlet and outlet respectively, an inlet seal and an outlet seal disposed in said conduit to provide liquid tight closures at the two ends of the conduit, and to allow access to the flexible wire entering and leaving the conduit, a liquid reservoir located between and in communication with the liquid inlet and the liquid outlet to provide an endless flow path for liquid in the reservoir, and a pump to circulate liquid around the endless flow path, said liquid having such viscosity and of sufficient velocity to apply traction to the wire in the conduit.

2. Apparatus according to claim 1 including a liquid reservoir and a pump located in series between the outlet and inlet of the conduit to provide an endless flow path for the liquid.

3. Apparatus according to claim 1 including means for introducing the liquid into the conduit in a continuous stream.

4. Apparatus according to claim 1 including means located outside the conduit for exerting other additional traction forces on the wire.

5. Apparatus according to claim 4 in which said means comprises a roller drive.

6. Apparatus according to claim 2 including a plurality of spaced guide members encircling the wire and located in series to make a liquid tight fit in the input of the conduit, and passages connecting the spaces between the guide members to the liquid reservoir.

7. Apparatus according to claim 2 including three spaced guide members arranged to encircle the wire located in series to make a liquid tight fit in the outlet of the conduit, the inner member being arranged to make a sliding fit over the entire outer surface of the wire passing through it to remove most of the liquid from the wire, and the middle guide member making a comparatively loose fit on the wire, means for passing a high velocity stream of gas upstream past the middle guide member to remove liquid from the wire as it passes through the middle member, and means between the inner and middle members to eject the gas and removed liquid.

8. Apparatus according to claim 1 in which the liquid comprises a welding flux.

9. Apparatus according to claim 1 in which the liquid comprises a shield to exclude air from a weld pool.

10. Apparatus according to claim 1 in which the liquid constitutes a coolant for cooling an arc welding torch including a contact tip fed with the wire.

11. Apparatus according to claim 10 in which the liquid is used to cool the the contact tip of the torch.